United States Patent [19]

Hall

[11] Patent Number: 4,794,908
[45] Date of Patent: Jan. 3, 1989

[54] GAS-FIRED HEATER MEANS

[76] Inventor: Donald O. Hall, 2801 Lencott Dr., Louisville, Ky. 40216

[21] Appl. No.: 8,757

[22] Filed: Jan. 30, 1987

[51] Int. Cl.$^4$ ............................................. F24H 3/08
[52] U.S. Cl. ............................... 126/112; 126/116 B; 126/110 R; 126/116 R; 126/99 D; 126/99 R; 126/104 A; 126/104 R
[58] Field of Search ..................... 431/284, 37, 40, 62, 431/89, 171, 352, 258, 12, 11; 126/110 R, 110 B, 116 R, 110 A, 99 R, 99 D, 104 R, 104 A, 90 R, 109, 99 A, 110 AA, 104 A, 117, 116 A, 77, 112

[56] References Cited

U.S. PATENT DOCUMENTS

| | | | |
|---|---|---|---|
| 1,887,514 | 11/1932 | Pialt | 431/37 |
| 1,898,597 | 2/1933 | Pichup | 431/37 |
| 1,935,237 | 11/1933 | Bryant | 431/12 X |
| 1,943,053 | 1/1934 | Boisset | 126/104 A |
| 1,977,478 | 10/1934 | Hanley | 431/37 |
| 2,161,118 | 6/1939 | Yeager | 431/37 |
| 2,260,535 | 10/1941 | McCollum | 431/37 |
| 2,410,547 | 11/1946 | McCollum | 126/110 R |
| 2,620,787 | 12/1952 | Zink | 126/110 R |
| 2,722,180 | 11/1955 | McIlvane | 126/110 R |
| 4,248,203 | 2/1981 | Willson | 126/77 |
| 4,265,213 | 5/1987 | Gorsuch et al. | 126/77 X |
| 4,580,546 | 4/1986 | Bannett | 126/77 X |

FOREIGN PATENT DOCUMENTS

| | | | |
|---|---|---|---|
| 56-7819 | 10/1957 | Italy | 126/116 A |
| 166145 | 11/1932 | Switzerland | 126/110 R |

*Primary Examiner*—Samuel Scott
*Assistant Examiner*—Carl D. Price
*Attorney, Agent, or Firm*—Jon C. Winger; Charles G. Lamb; Harry B. O'Donnell, III

[57] ABSTRACT

This invention provides improved gas-fired heater means for supplying heat to a space, such as a room, house, building, vehicle, or the like. Basically, the improved gas-fired space heater means comprises: a first duct-like member having opposite front and rear ends and provided adjacent its front end with means for receiving, mixing and igniting a mixture of pressurized fuel gas and a combustion supporting gas within its interior that is discharged through exhaust conduit means from its rear end to an exhaust outlet located adjacent to its front end; a second duct-like member, surrounding the first duct-like member and the exhaust conduit means and having opposite forward and rearward ends, with the forward and rearward ends of the second duct-like member being respectively located adjacent to the front and rear ends of the first duct-like member and the second duct-like member having a fluid inlet opening located proximate to one of the opposite front and rear ends of the first duct-like member and a fluid outlet opening located between the opposite front and rear ends of the first duct-like member; and means for supplying a stream of pressurized fluid to the inlet opening of the second duct-like member for discharge through the outlet opening of the second duct-like member after having passed over the exteriors of and received heat from the first duct-like member and the exhaust conduit means to supply heated fluid to a space via second conduit means interconnectable between that space and the outlet opening of the second duct-like member.

6 Claims, 3 Drawing Sheets

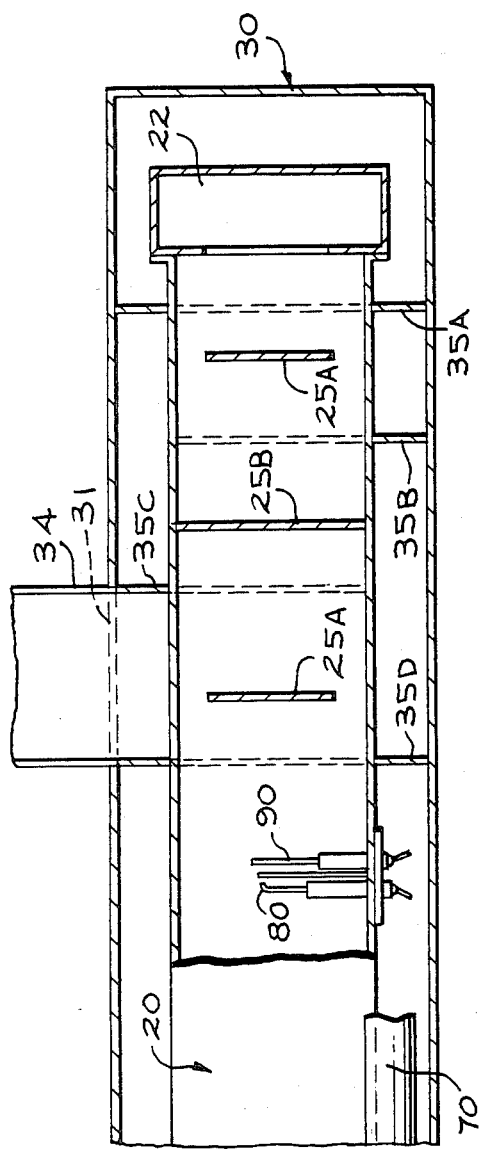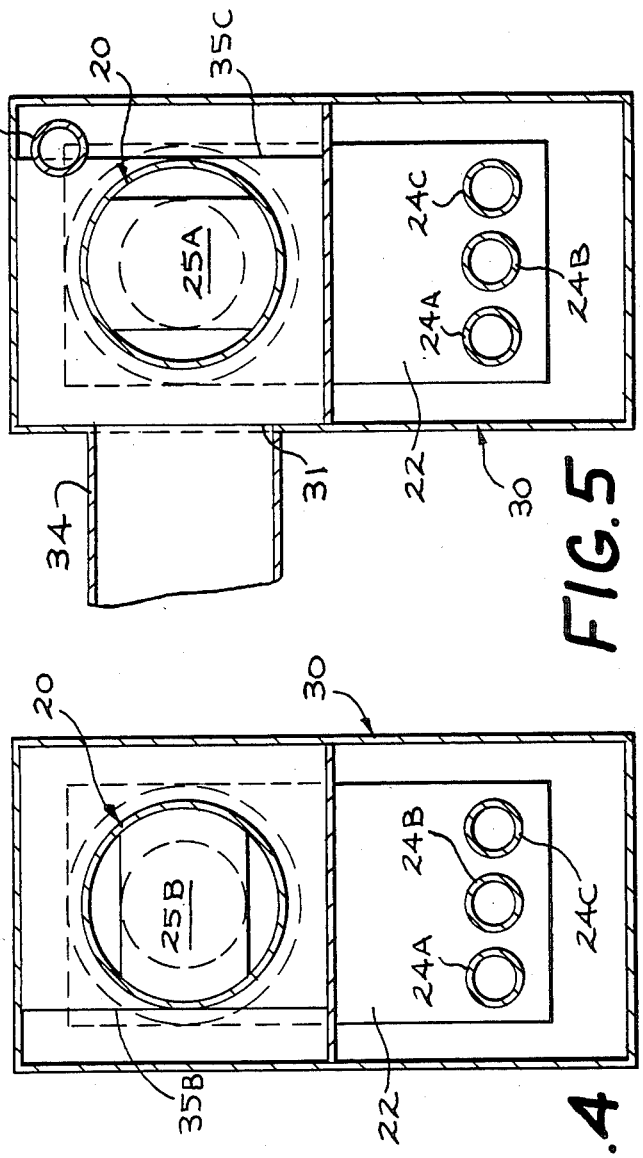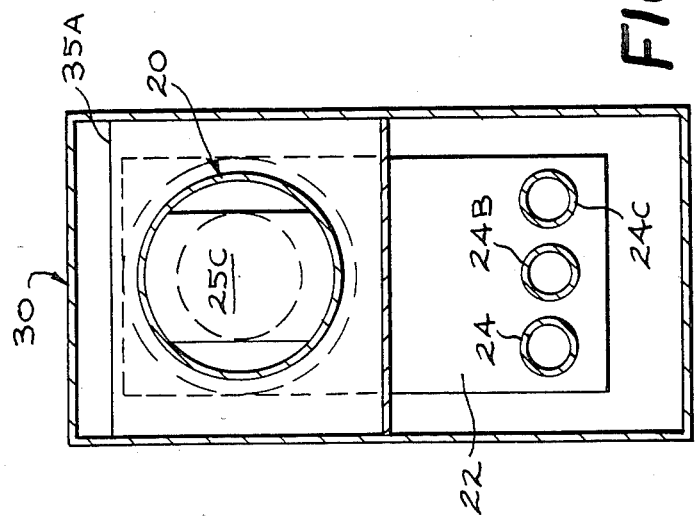

GAS-FIRED HEATER MEANS

BACKGROUND OF THE INVENTION

This invention relates to means for supplying heat to a space, such as a room, house, building, or the like and, more particularly, to improved gas-fired heater means for supplying such heat.

More specifically, the present invention provides an improved version of the gas-fired heater means shown and described in my earlier U.S. patent application Ser. No. 06/448,932, filed Dec. 13, 1982, which, in turn, were an improvement over the gas-fired heater means shown and described in U.S. Pat. No. 3,670,713, issued to R. W. Abbott on Feb. 8, 1972, and the liquid fuel heater means shown and described in U.S. Pat. No. 3,029,802, issued Apr. 17, 1962 to J. L. Breese.

SUMMARY OF THE INVENTION

Basically, the improved gas-fired space heater means of the present invention comprises: a first duct-like member having opposite front and rear ends and provided adjacent its front end with means for receiving, mixing and igniting a mixture of pressurized fuel gas and a combusion supporting gas within its interior that is discharged through exhaust conduit means from its rear end to an exhaust outlet located adjacent to its front end; a second duct-like member, surrounding the first duct-like member and the exhaust conduit means and having opposite forward and rearward ends, with the forward and rearward ends of the second duct-like member being respectively located adjacent to the front and rear ends of the first duct-like member and the second duct-like member having a fluid inlet opening located proximate to one of the opposite front and rear ends of the first duct-like member and a fluid outlet opening located between the opposite front and rear ends of the first duct-like member; and means for supplying a stream of pressurized fluid to the inlet opening of the second duct-like member for discharge through the outlet opening of the second duct-like member after having passed over the exteriors of and received heat from the first duct-like member and the exhaust conduit means to supply heated fluid to a space via second conduit means interconnectable between that space and the second outlet opening of the second duct-like member.

Assuming that the fluid to be heated and the combustion supporting gas are identical, e.g. both are air, the improved heater means of the present invention can be provided with combustion supporting gas intake means adjacent to the fluid outlet opening of the second duct-like member that are fluid connected to the first duct-like member for diverting a stream of the pressurized fluid into the front end of the first duct-like member for mixing and ignition therein with the fuel gas. And, while most certainly not limited thereto, propane has produced good results when employed as the fuel gas.

It is further desirable that thermally responsive control means be mounted adjacent to the aforenoted combustion supporting gas intake means for controlling the flow therethrough of the combustion supporting gas in inverse proportion to the temperature of the combustion supporting gas.

BRIEF DESCRIPTION OF THE DRAWINGS

The present invention is illustrated in the accompanying drawings, wherein:

FIG. 2 is a view taken along line 2—2 of FIG. 1;
FIG. 3 is a view taken along line 3—3 of FIG. 1;
FIG. 4 is a view taken along line 4—4 of FIG. 1;
FIG. 5 is a view taken along line 5—5 of FIG. 1.

DETAILED DESCRIPTION

Figure 1:
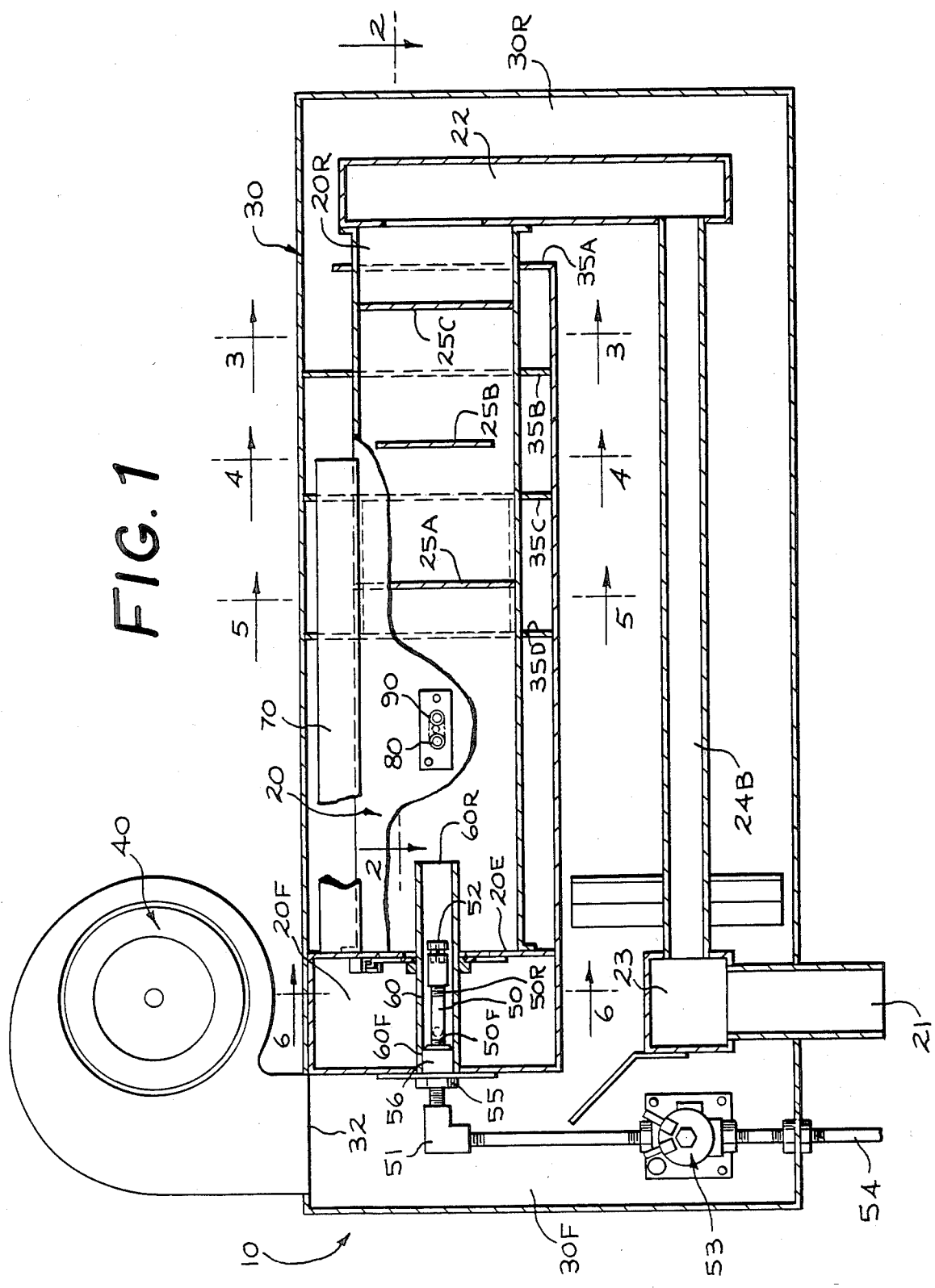
FIG. 1 is a somewhat schematic, partly-sectioned and broken, side elevational view illustrating one presently preferred form of the improved gas-fired heater means provided in accordance with the present invention.
Figure 6A:
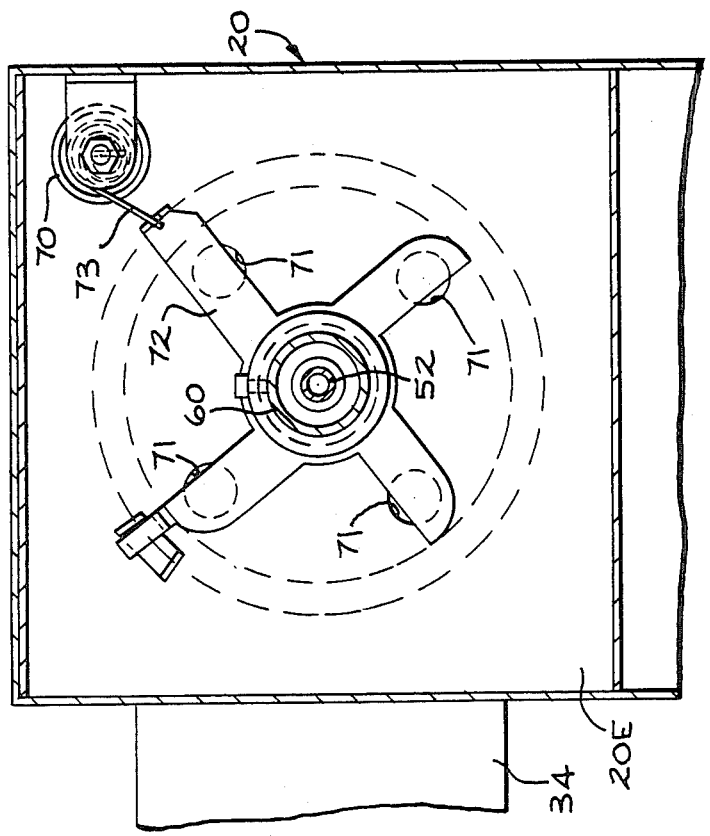
FIG. 6A is a view similar to FIG. 6 but showing the thermally responsive gas flow control means illustrated therein in a different operating condition.
Figure 6:
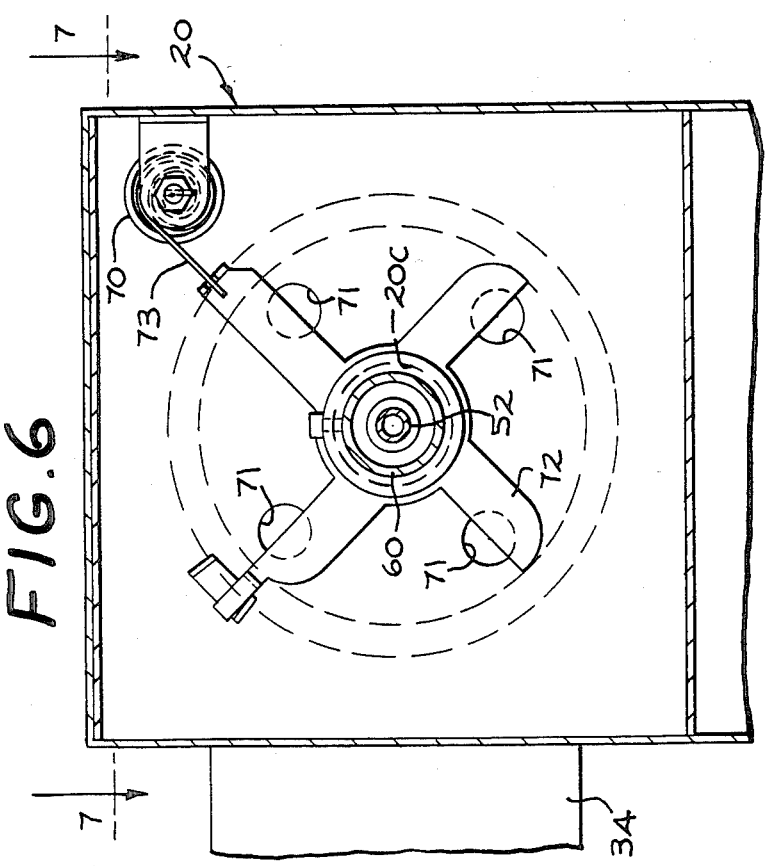
FIG. 6 is a view taken along line 6—6 of FIG. 1.
Figure 7:
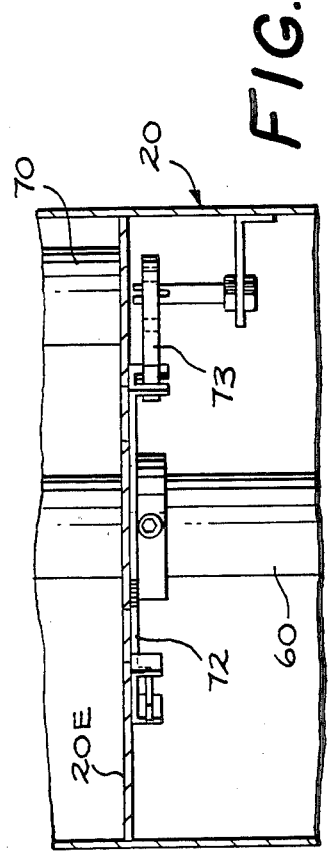
FIG. 7 is a view taken along line 7—7 of FIG. 6.

Turning now to the drawings, and more particularly to FIGS. 1–7 thereof, there is shown, somewhat schematically, a presently preferred form of the improved gas-fired heater means 10 that are provided in accordance with the present invention for supplying heat to a space (not shown), such as a room, house, building, vehicle or the like.

As illustrated, the heater means 10 basically comprises a first, or inner, duct-like member 20 and a second, or outer, duct-like member 30.

The first, or inner, duct-like member 20 has opposite front 20F and rear 20R ends and a long central axis extending therebetween and is provided adjacent to its front end 20F with means, which will be hereinafter described in detail, for receiving, mixing and igniting a mixture of pressurized fuel gas and a combustion supporting gas within its interior that is discharged through exhaust conduit means from its rear end 20R to an exhaust outlet or vent 21 located adjacent to its front end 20F to the atmosphere. As best illustrated in drawing FIGS. 1 and 3–5, the exhaust conduit means preferably include a first collector section 22 that is fluid-connected to the rear end 20R of the first duct-like member 20, a second collector member 23 that is fluid connected to the exhaust vent 21 and a manifold of heat-transferring tubes 24A, 24B and 24C that are fluid connected between the two collector sections 22 and 23.

The second, or outer, duct-like member 30 surrounds the first, or inner, duct-like member 20 as well as the collector portions 22 and 23 and intervening manifold of tubes 24A, 24B of the exhaust conduit means therefor, and has opposite forward 30F and rearward 30R ends, with the forward 30F and rearward 30R ends of the second duct-like member 30 being respectively located adjacent to the front 20F and rear 20R ends of the first duct-like member 20 and the second duct-like member 30 having a fluid outlet opening 31 located between the opposite front 20F and rear 20R ends of the first duct-like member 20. The second, or outer, duct-like member 30 has a fluid inlet opening 32 proximate to one of the opposite front 20F or rear 20R ends (the front end 20F, as illustrated) of the first, or inner, duct-like member 20.

In addition, means, such as the blower 40 illustrated in FIG. 1 of the drawings, are provided for supplying a stream of pressurized fluid to the inlet opening 32 of the second, or outer, duct-like member 30 for discharge through the outlet opening 31 of the second, or outer, duct-like member 30 after having passed over the exteriors of and received heat from the first duct-like member 20 and the exhaust conduit means 23, 24A, B, C and 22 to supply heated fluid to a space (unshown) to be heated via a hollow conduit means 34 that is interconnectable between such a space and the outlet opening 31 of the second, or outer, duct-like member 30.

As further shown in drawing FIGS. 1, 2, 6, 6A and 7, the aforenoted means for receiving, mixing and igniting a pressurized mixture of fuel gas and a combustion supporting gas within the interior of the first, or inner, duct-like member 20 include gas fuel-receiving 50 pipe that has opposite front 50F and rear 50R ends and a long central axis extending therebetween that is also generally co-axially aligned with the aforenoted long central axis of the first duct-like member 20.

The front end 50F of this gas-receiving pipe extends toward the front end wall of the first, or inner, duct-like member 20 and can be connected, in a well known manner, by means including an elbowed pipe fitting 51 shown in drawing FIG. 1, to a source of pressurized gas fuel (not shown) such as a tank of propane through a pressure regulator 53 and other piping 54 upstream thereof which extends through the wall of the second, or outer, duct-like member 30.

And, the rear end of the fuel gas-receiving pipe 50 extends toward the front end 20F of the first, or inner, duct-like member and is provided with a nozzle 52 through which the pressurized fuel gas can be discharged into the interior of the first, or inner, duct-like member 20 via a second pipe 60 that surrounds and is generally co-axially aligned with the fuel gas-receiving pipe 50.

As further illustrated, this just-noted second pipe 60 has opposite front 60F and rear 60R ends and a long central axis that extends therebetween and is generally co-axially arranged with the aforenoted other two long axes. Its front end 60F passes through the front end wall of the first, or inner, duct-like member 20 and is fastened thereto by a nut 55 that is threaded over the front end of another pipe fitting 56 that is located within the second pipe 60 and fluid connected between the aforenoted elbowed pipe fitting 51 and the front end 50F of the fuel gas-receiving pipe 50. The rear end 60R of this second pipe extends through a circular opening 20C that is recentrally located in an intermediate wall 20E of the first, or inner, duct-like member and directs discharge of the fuel gas from the aforenoted nozzle 52 into the interior of said first, or inner, duct-like member 20.

In the illustrated embodiment of the improved gas-fired heater means 10 of the present invention, the pressurized combustion supporting gas that is mixed and ignited with the pressurized fuel gas and the fluid to be heated are identical; they are both air. And, fluid communication means are provided between the two duct-like members 20 and 30 in the form of combustion supporting gas intake means 70 that are located adjacent to the outlet opening 31 from the second, or outer, duct-like member such that a portion of the pressurized air stream that is supplied by the blower means 40 to the fluid inlet opening 32 of the second, or outer, duct-like member 30 is used for mixing with the pressurized fluid gas that is supplied via the fuel gas-receiving pipe 50.

As best shown in drawing FIGS. 1–3, 6, 6A and 7, these just-noted fluid communication means also include plural apertures 71 which extend through the aforenoted intermediate wall 20E of the first, or inner, duct-like member 20.

As still further illustrated in drawing FIGS. 1 and 2, igniter means 80 and flame detector means 90 of a well-known type are provided for the heater means 10 of the present invention for respectively igniting and detecting the flame resulting from ignition of the pressurized mixture of fuel gas and combustion supporting gas and are located within the interior of the first, or inner, duct-like member 20 between the rear end 60R of the just-noted second pipe 60 and the exhaust vent means 22 for the products of combustion of said mixture that is located at the rear end 20R of the first, or inner, duct-like member 20.

As additionally shown in drawing FIGS. 1–5, baffle means, comprising a plurality of axially-spaced apart baffle plates 25A, 25B and 25C are desirably situated within the interior of the first, or inner, duct-like member 20 between the just-noted igniter 80 and flame detector 90 means and the rear end 20R of that first, or inner, duct-like member 20 to alternatively deflect the flow of the ignited mixture of the pressurized fuel gas and combustion supporting gas towards the top, bottom and sides of that first, or inner, duct-like member 20 and, thus, promote transfer of heat therefrom to the stream of fluid that is to be heated by its passage over the exterior thereof enroute to the fluid outlet opening 31 of the second, or outer, duct-like member 30 for subsequent delivery to the space to be heated via the hollow conduit means 34 that is interconnectable to said outlet opening 31. And, additional baffle plates 35A, 35B, 35C and 35D are provided within the interior of the second, or outer, duct-like member 30 for alternatively deflecting the flow of the pressurized fluid that is to be heated into contact with all sides of the rear end 20R of the first, or inner, duct-like member 20 and to guide the passage of said fluid to the fluid outlet opening 31 of the second, or outer, duct-like member 30 for subsequent delivery to the space to be heated via the hollow conduit means 34 that is interconnectable to said outlet opening 31.

Finally, as best shown in drawing FIGS. 1, 6, 6A and 7, thermally responsive control means are provided for controlling the flow of combustion supporting gas through the combustion supporting gas intake means in inverse proportion to the temperature of the combustion supporting gas. As illustrated, these thermally responsive control means include a swastika-shaped valve member 72 that has its center pivotally mounted around the exterior of the aforenoted second pipe 60 immediately axially rearward of the aforenoted intermediate wall 20E of the first, or inner, duct-like member 20, with the distal ends of its four arms respectively at least partially covering one of the aforenoted plural apertures 71 that extend through said intermediate wall 20E. And, as further shown, the swastika-shaped valve member 72 is movable by a thermally-responsive coil 73 that is mounted adjacent to the combustion supporting gas intake means 70 between a first operating position (FIG. 6), wherein the temperature of the combustion supporting gas is low and restriction of the apertures 71 by the valve member 72 is slight and the flow of said combustion-supporting gas therethrough high, and a second operating position (FIG. 6A), wherein the temperature of the combustion supporting gas is higher and the restriction of the apertures 71 by the valve member 72 is greater and the flow of said combustion-supporting gas therethrough is reduced.

While various materials and methods may be employed for constructing the improved gas-fired heater means 10 of the present invention, particularly good results have been obtained by forming the first, or inner, duct-like member 20 of 310 stainless steel.

It should be apparent that while there has been described what is presently considered to be a presently preferred form of the present invention in accordance with the Patent Statutes, changes may be made in the disclosed device without departing from the true spirit and scope of this invention. It is, therefore, intended that the appended claims shall cover such modifications and applications that may not depart from the true spirit and scope of the present invention.

What is claimed is:

1. Improved gas-fired space heater means, comprising in combination:

(a) a first duct-like member being provided with an interior and an exterior, said member having opposite front and rear ends, said front end being provided with a combustion supporting gas plenum, said plenum having an inlet and an outlet, said outlet being in flow communication with means for receiving, mixing and igniting a mixture of pressurized fuel gas and a combustion supporting gas within said interior, said rear end having an exhaust conduit means in fluid communication with the interior of said first duct and an exhaust outlet located adjacent to said front end, said first duct-like member being provided with first baffle means therein;

(b) a second duct-like member, surrounding said first duct-like member and said exhaust conduit means and having opposite forward and rearward ends, with said forward and rearward ends of said second duct-like member being respectively located adjacent to said front and rear ends of said first duct-like member, said second duct-like member being provided with second baffle plates disposed to deflect the flow of a pressurized fluid into contact with all sides of said exterior of said first duct-like member, said second duct-like member including an aperture for receiving said exhaust outlet;

(c) said second duct-like member having a fluid inlet opening located proximate to one of said opposite front and rear ends of said first duct-like member and a pressurized fluid outlet opening located between said opposite front and rear ends of said first duct-like member;

(d) means for supplying a stream of said pressurized fluid to said inlet opening of said second duct-like member for discharge through said outlet opening of said second duct-like member after having passed over the exterior of and received heat from said first duct-like member and said exhaust conduit means to supply heated fluid to a space via second conduit means connected said outlet opening of said second duct-like member;

(e) combustion supporting gas intake means are provided with an inlet adjacent to said fluid outlet opening of said second duct-like member and positioned adjacent said second baffle plates and between said first and second duct-like members, said combustion supporting gas intake means outlet being in fluid communication with said plenum inlet for diverting a portion of said stream of pressurized fluid into said front end of said first duct-like member for mixing and ignition therein with said fuel gas; and (f) temperature-responsive control means for controlling the flow of said combustion supporting gas through said combustion supporting gas intake means in inverse proportion to the temperature of said combustion supporting gas, said temperature-responsive control means including a valve means in said plenum outlet, said valve means being operable in response to a temperature sensing means.

2. The invention of claim 1, wherein said fluid is air.

3. The invention of claim 2, wherein said fuel gas is propane.

4. The invention of claim 1, wherein said pressurized fluid is air.

5. The invention of claim 4, wherein said fuel gas is propane.

6. The gas-fired space heater means of claim 1, wherein the outlet of said plenum includes four apertures circumscribing a pressurized fuel gas conduit extending through a wall in said plenum, and said valve member is swastika-shaped with four arms thereon, wherein the distal ends of each arm are in coverable relation with each aperture, the distal arms being movable in response to said temperature sensing means.

* * * * *